United States Patent
Mathur et al.

(10) Patent No.: US 8,285,992 B2
(45) Date of Patent: Oct. 9, 2012

(54) METHOD AND APPARATUSES FOR SECURE, ANONYMOUS WIRELESS LAN (WLAN) ACCESS

(75) Inventors: Saurabh Mathur, Plainsboro, NJ (US); Junbiao Zhang, Bridgewater, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 1115 days.

(21) Appl. No.: 11/918,512

(22) PCT Filed: Apr. 22, 2005

(86) PCT No.: PCT/US2005/013712
§ 371 (c)(1),
(2), (4) Date: Oct. 15, 2007

(87) PCT Pub. No.: WO2006/115479
PCT Pub. Date: Nov. 2, 2006

(65) Prior Publication Data
US 2009/0070859 A1    Mar. 12, 2009

(51) Int. Cl.
*H04L 29/06* (2006.01)
(52) U.S. Cl. .................................... 713/171; 380/270
(58) Field of Classification Search ............... 713/168, 713/171, 153, 152, 164; 726/12, 13, 14, 726/3; 380/259, 278, 283, 44, 270
See application file for complete search history.

(56) References Cited

U.S. PATENT DOCUMENTS

| 7,185,360 B1* | 2/2007 | Anton et al. ............... 726/3 |
| 2004/0214570 A1 | 10/2004 | Zhang et al. |
| 2005/0086346 A1* | 4/2005 | Meyer ..................... 709/229 |
| 2006/0173844 A1 | 8/2006 | Zhang et al. |
| 2006/0251254 A1* | 11/2006 | Peng et al. .................. 380/270 |

FOREIGN PATENT DOCUMENTS

| JP | 2004312257 A | 11/2004 |
| JP | 2005039588 A | 2/2005 |
| JP | 2005039683 A | 2/2005 |
| JP | 2005086623 A | 3/2005 |
| WO | WO2004084458 | 9/2004 |
| WO | 2004095803 A1 | 11/2004 |
| WO | WO2004098166 A1 | 11/2004 |
| WO | WO2005026915 A2 | 3/2005 |

* cited by examiner

*Primary Examiner* — Gilberto Barron, Jr.
*Assistant Examiner* — Izunna Okeke
(74) *Attorney, Agent, or Firm* — Robert D. Shedd; Jeffrey M. Navon; Catherine A. Cooper

(57) ABSTRACT

A method and system for providing secure, anonymous access to a wireless local area network, including configuring an access point to drop packets except packets exhibiting an URL access protocol like HTTP and HTTPS, intercepting a URL access request by an access point from a mobile device via a web browser, re-directing the URL access request to a web server by the access point generating a security key by one of the access points and the web server, communicating the generated security key to the said web server securely by the access point or vice versa and setting the security key by the access point is described. A mobile device including means for forwarding a request for secure access to a wireless local area network via a URL access request, means for receiving a mobile code or a signal for displaying a security key and means for setting the security key is also described.

12 Claims, 2 Drawing Sheets

METHOD AND APPARATUSES FOR SECURE, ANONYMOUS WIRELESS LAN (WLAN) ACCESS

This application is a National Stage Application and claims the benefit, under 35 U.S.C. §365 of International Application PCT/US2005/013712 filed Apr. 22, 2005, which was published in accordance with PCT Article 21(2) on Nov. 2, 2006 in English.

FIELD OF THE INVENTION

The present invention relates to a mechanism/technique for enabling a mobile communications device to securely access a wireless local area network (WLAN).

BACKGROUND OF THE INVENTION

With the increasing proliferation of wireless networks, many businesses are deploying them to facilitate their mobile workforce. Since wireless networks are more prone to unauthorized usage and eavesdropping compared to their wired counterparts, companies require authorized users to present some form of credential to the network in order to gain access. The credentials can be one or more of the following:
 A user name/password combination,
 A hardware token like SecureID,
 Biometric identification like fingerprint.

The wireless network maintains a database (DB) of valid, authorized users and checks the user's credentials against this database. In other words, the users must be able to prove their identity in order to gain secure access to the network. However, there is another class of users. These are the guests of a corporation (business associates, customers, etc.), visiting a business facility. Such users do not have an account in the DB. Typically, these guests are given a temporary credential that they can use during their visit. This leads to several administrative problems:
 The guest account needs to be maintained in the database.
 If a hardware token is used, there is a chance that the guest forgets to return it upon leaving. In this case, the token must be revoked.

SUMMARY OF THE INVENTION

As an alternative, a business may provide a separate wireless network (either logical or physical) that is meant exclusively for guest usage. Typically, this network is isolated from the corporate network and anyone can access it without providing credentials to the network. In other words the network provides anonymous access to its users. Hereinafter, this network is called the "guest network" or "guest WLAN". Even though no user authentication is done, the wireless link must be secured to prevent eavesdropping. In the absence of the wireless link security, all guest network traffic is sent unencrypted.

In the guest network/WLAN, an access point (AP) is the entry point to the guest network. Further, the guest network/ WLAN has the following components that are relevant to the current invention:
 A web server
 Packet filter and redirector
 Optional mobile code (ActiveX/Plugin)
The web server, the packet filter and redirector may be co-located with the AP In the present invention, no user authentication is done. The login process starts after normal browser interactions without any user credentials. Secondly, the login step that starts securing the wireless link results from the access to a web page via a secure access protocol such HTTPS that uses a universal resource location (URL) access. Finally, the security key is set on both the client machine (mobile communications device) and the AP. Thus the wireless link is secured. A method and system for providing secure, anonymous access to a wireless local area network, including configuring an access point to drop packets except packets exhibiting a URL access protocol like HTTP and HTTPS, intercepting URL access request by an access point from a mobile device via a web browser, re-directing the URL access request to a web server by the access point, generating a security key by one of the access points and the web server, communicating the generated security key to the said web server securely by the access point or vice versa and setting the security key by the access point is described. A mobile device including means for forwarding a request for secure access to a wireless local area network via a URL access request, means for receiving a mobile code or a signal for displaying a security key and means for setting the security key is also described.

BRIEF DESCRIPTION OF THE DRAWINGS

These and other aspects, features and advantages of the present invention will become apparent from the following detailed description of preferred embodiments, which is to be read in connection with the accompanying drawings.

DETAILED DESCRIPTION OF THE PREFERRED EMBODIMENTS

Figure 1:
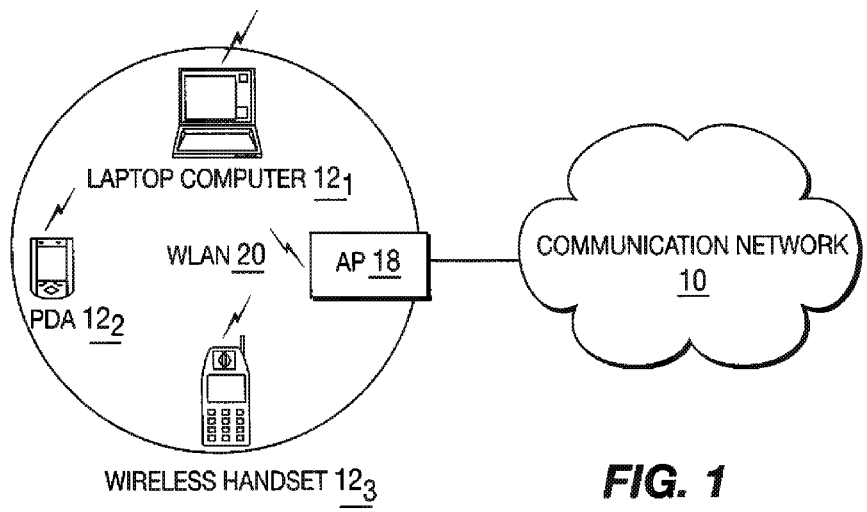
FIG. 1 is a block diagram of a system for implementing the method for establishing secure anonymous access to a network, e.g., wireless local area network.

FIG. 1 is a block schematic diagram of a wireless local area network 20 for enabling at least one mobile communication device, and preferably a plurality of mobile communication devices (e.g., mobile communication devices $12_1$, $12_2$, and $12_3$) to securely access the communication network 10. In a preferred embodiment, the mobile communication device $12_1$ comprises a laptop computer, whereas the mobile communication device $12_2$ comprises a Personal Data Assistant, and the mobile communication device $12_3$ comprises a wireless handset.

In the illustrated embodiment, AP 18 includes a wireless transceiver (not shown) for exchanging radio frequency signals with a radio transceiver (not shown) within each mobile communication device. To this end, AP 18 employs one or more well-known wireless data exchange protocol, such as the "HiperLan 2" or IEEE 802.11 protocols. Indeed, wireless local area network 20 may include a plurality of APs, where each AP could employ different wireless protocols to accommodate different mobile communication devices.

Figure 2A:
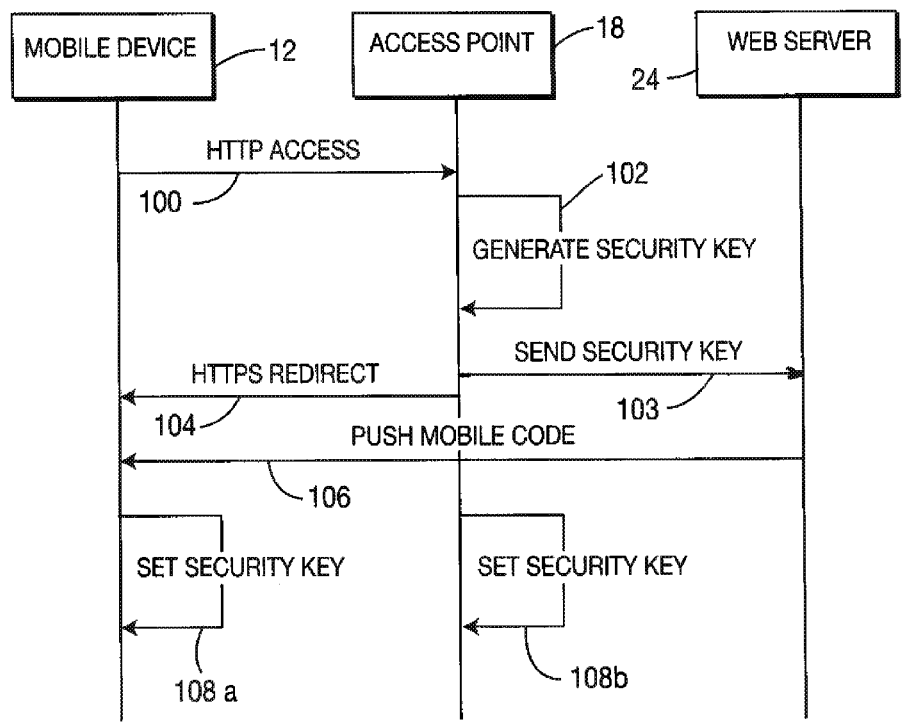
FIG. 2A is a "ladder" diagram depicting one embodiment of the communications occurring between the network/ WLAN and the mobile communications device over time to enable secure wireless LAN access to the guest network.

The technique of the present invention can best be understood by reference to FIG. 2A, which depicts the sequence of communications that occurs over time among a mobile communication device, e.g., mobile communications device $12_1$, AP 18, and the web server 24. When a user moves into a wireless LAN hotspot and opens up the web browser, the following events occur in one embodiment where the web server, the packet filter and redirector are co-located with the AP:

1. The AP intercepts the URL access request generated by web browser software running on a mobile communications device. The AP generates a unique security key (e.g. a WEP key) for the user. The AP is configured to drop packets except URL access protocol packets (e.g. HTTP and HTTPS).
2. The AP securely redirects the user to the web server via HTTPS secure URL access protocol. The generated security key is passed to the web server as a parameter. Since a secure URL access protocol is used, all the parameters are securely communicated to the web server. As a further measure, the security key parameter may be encrypted using a key pre-shared between the AP and the web server.
3. After some browser interactions (e.g. the WLAN web server returns a welcome page, the user clicks on a "login" button on this page), the user browser gets to a secure web page that contains mobile code (ActiveX control/Plugin) and the generated security key, for example a Wired equivalent Privacy (WEP) key.
4. The same security key is set on the AP and the guest's machine (by the mobile code). This secures the wireless link.

To initiate secure access, the mobile communications device $12_1$ transmits a request for access to the AP 18 during step 100 of FIG. 2A. In practice, the mobile communications device $12_1$ initiates the access request by way of a URL access demand launched by a web browser software program executed by the mobile communications device $12_1$. In response to the access request, the AP 18 generates a security key at step 102 of FIG. 2A and communicates it securely with the web browser (not shown). AP 18 then sends the security key to web server 24 at step 103. The AP then redirects the web browser software in the mobile communications device to a local welcome page on the AP during step 104. Following step 104, and after some browser interactions (not shown), the user browser gets to a secure, internal web page that contains mobile code (ActiveX control/Plugin) and the generated security key. The web server 24 then pushes a mobile code to the mobile device requesting access at step 106. Upon receipt of the mobile code, both the mobile communications device and the AP set the security key at steps 108a and 108b, which is used for communications for the remainder of the session. Each new session requires the method to be re-executed.

An ActiveX control is essentially an executable program that can be embedded inside a web page. Many software browser programs, such Microsoft Internet Explorer have the capability of displaying such web pages and invoking the embedded ActiveX controls, which can be downloaded from a remote server (e.g., the web server 24). The execution of the ActiveX controls are restricted by the security mechanisms built into the browser software. In practice, most browser programs have several different selectable security levels. At the lowest level, any ActiveX control from the web can be invoked without restriction. In the highest level, no ActiveX control can be invoked from the browser software.

Normally, the security level is set to medium, in which case only those ActiveX controls that have digital signatures can be invoked. For such ActiveX control, the browser software first checks the validity of the signature before invoking the ActiveX control to make sure that the following conditions exist: (1) the source of the ActiveX control can be traced, and (2), the ActiveX control has not been altered by anyone else other than the entity who signed it. In the illustrated embodiment, the web server 24 uses ActiveX control to deliver and set the security key on the mobile communications device $12_1$. The ActiveX control is very simple and its only function is to set the key on the mobile communications device $12_1$ by providing the device a web page with the embedded ActiveX control.

Once both the mobile device and the AP have the security key set, then secure data communications are enabled in accordance with the security key.

The above-identified method for enabling secure wireless LAN access will work seamlessly for the majority of mobile communications devices since most devices employ browser software that support ActiveX controls, and the security level of the browser software in most devices is generally set to medium. For those mobile communications devices whose browser software is currently set with highest level of security, a request will be sent to the device to ask the user to temporarily alter the security setting for the web browser software to medium. For those mobile communication devices that do not employ browser software capable of supporting ActiveX controls, a browser software plug-in can be used. If the AP 18 detects that the browser software in the mobile communications device $12_1$ seeking access does not support ActiveX control, the user of the mobile communications device $12_1$ will be prompted to download and install a small plug-in. The functionality of the plug-is essentially the same as the key-setting function of the ActiveX control. Once the plug-in is installed in the mobile communications device $12_1$, the security key can be set on the mobile communications device by packaging the security key in a special file that invokes the plug-in. In turn, the plug-in reads the security key file and sets the key in the mobile communications device $12_1$.

For practical purposes, the security key setting ActiveX control should be parameterized. In other words, the ActiveX control should take the security key as a parameter. In this way, the web server 24 only needs to maintain a single compiled ActiveX control and use it for different sessions by supplying different parameters to requesting mobile communications devices. Otherwise, the web server 24 would have to build the security key inside the ActiveX control, i.e. build a different ActiveX control for each session, an inefficient process.

Figure 2B:
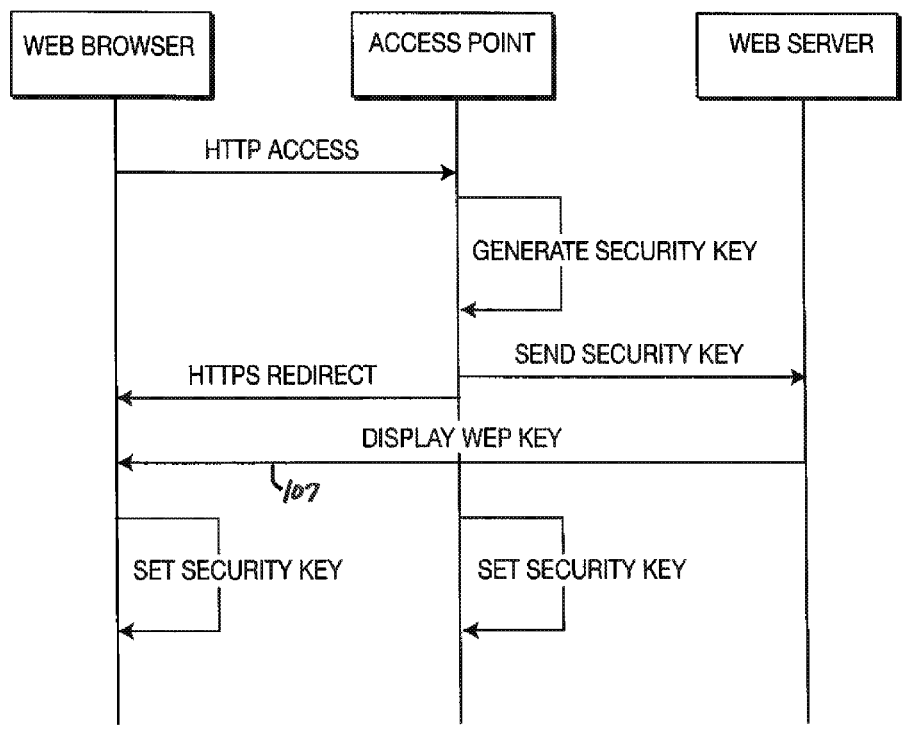
FIG. 2B is a "ladder" diagram depicting an alternative embodiment of the communications occurring between the network/WLAN and the mobile communications device over time to enable secure wireless LAN access to the guest network.

FIG. 2B is also a ladder diagram depicting the communications occurring between the wireless local area network and the mobile communications device over time to enable secure wireless local area network access to the guest network. However, this embodiment is directed to the manual case where the web server 24 displays the security key to the user who is then directed to follow the instructions on the display to set the security key on the mobile communications device. In this embodiment, the following events occur:

1. The AP intercepts the URL access request generated by the web browser software running on a mobile communications device. The AP generates a unique security key for the user. The AP is configured to drop all packets except URL access protocol packets like HTTP and HTTPS.
2. The AP redirects the user to the web server. The generated security key is passed to the web server as a parameter. Since secure URL access protocol is used to communicate with the web server, this is secure. As a further measure, the security key parameter may be encrypted using a key shared between the AP and the web server.

3. After some browser interactions (e.g. the web server returns a welcome page, the user clicks on a "login" button on this page), the user browser gets to a secure, internal web page that displays the security key to the user at step 107 and optionally, gives instructions on how to set the security key on the mobile communications device.

4. The user follows the instructions (if provided) and sets the security key on the mobile device.

5. The same security key is set on the AP. This secures the wireless link.

In case the web server is not co-located with the AP, the secure key is communicated between the web server and the AP via secure means. For example, the AP and the web server may pre-share another secure key exclusively for communication between the AP and the web server and use this key to encrypt the communication between the said AP and the web server.

Also, the security key may be generated by the web server instead of the AP and then communicated to the AP via secure means as described above.

Figure 3:
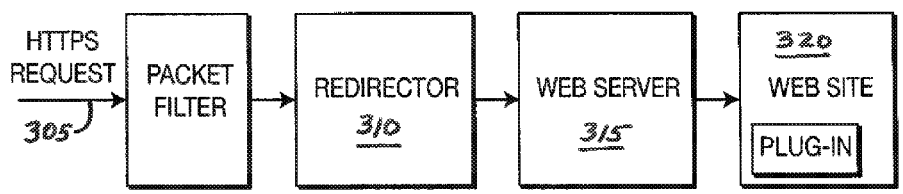
FIG. 3 is a block diagram of the components involved in providing secure anonymous wireless local area network access.

FIG. 3 is a block diagram of the components involved in providing secure anonymous wireless local area network access. Aft HTTP URL access request 305 goes through a packet filter, which drops all packets that are not HTTP/HTTPS URL access protocol packets. Any packets that are not dropped are forwarded to re-director 310, which re-directs the user's web browser to an Active X/Plug-in of a site 320 via a web server 315.

It is to be understood that the present invention may be implemented in various forms of hardware, software, firmware, special purpose processors, or a combination thereof, for example, within a mobile terminal, access point, or a cellular network. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for providing secure, anonymous access to a wireless local area network, said method comprising:
   configuring an access point to drop packets except packets exhibiting a Uniform Resource Locator URL access protocol;
   intercepting, by said access point, a Uniform Resource Locator URL access request from a mobile device via a web browser;
   re-directing, by said access point, said URL access request to a web server;
   generating, by said access point, a security key, wherein no authentication is performed between said access point and said mobile device;
   communicating securely, by the said access point, the generated security key to the said web server; and
   setting, by said access point, said generated security key, wherein said generated security key is a wired equivalent privacy key.

2. The method according to clam 1, further comprising receiving, by said mobile device, a mobile code.

3. The method according to claim 1, further comprising communicating securely for a duration of a session using said generated security key.

4. The method according to claim 1, wherein a packet filter is used to identify URL access protocol packets.

5. The method according to claim 1, wherein said web server resides on said access point.

6. The method according to claim 1, further comprising setting, by said mobile device, said generated security key.

7. A system for providing secure, anonymous access to a wireless local area network, comprising:
   means for configuring a packet filter of an access point to drop packets except packets exhibiting Uniform Resource Locator URL access protocol;
   said packet filter intercepting a Uniform Resource Locator URL access request from a mobile device via a web browser;
   said packet filter re-directing said URL access request to a web server;
   said access point generating a security key, wherein no authentication is performed between said access point and said mobile device; and
   by said access point setting said generated security key, wherein said generated security key is a wired equivalent privacy key.

8. The system according to claim 7, further comprising means for receiving, by said mobile device, a mobile code.

9. The system according to claim 7, further comprising means for communicating securely for a duration of a session using said generated security key.

10. The system according to claim 7, wherein a packet filter is used to identify URL access protocol packets.

11. The system according to claim 7, wherein said web server resides on said access point.

12. The system according to claim 7, further comprising means for setting, by said mobile device, said generated security key.

* * * * *